United States Patent [19]

Shioda et al.

[11] Patent Number: 4,688,829
[45] Date of Patent: Aug. 25, 1987

[54] TUBE JOINT

[75] Inventors: Mitsugu Shioda; Akio Inaba, both of Yokohama, Japan

[73] Assignee: Nifco Inc., Yokohama, Japan

[21] Appl. No.: 903,383

[22] Filed: Sep. 3, 1986

[30] Foreign Application Priority Data

Sep. 6, 1985 [JP] Japan .......................... 60-135673[U]

[51] Int. Cl.⁴ .............................................. F16L 3/00
[52] U.S. Cl. ....................................... 285/61; 285/64; 285/156; 285/305; 248/73; 248/74.2
[58] Field of Search ............... 285/61, 64, 156, 305, 285/325, 921, 61, 64, 56, 305, 325, 921; 248/73, 74.2, 74.3

[56] References Cited

U.S. PATENT DOCUMENTS

| 3,126,184 | 3/1964 | Kropp | 248/73 |
| 3,711,633 | 1/1973 | Ghirardi et al. | 285/156 |
| 4,386,752 | 6/1983 | Pavlak et al. | 248/74.3 |
| 4,418,944 | 12/1983 | Haines et al. | 285/156 |
| 4,429,907 | 2/1984 | Timmons | 285/156 |

FOREIGN PATENT DOCUMENTS 1239409 7/1971 United Kingdom ................ 248/73

Primary Examiner—Cornelius J. Husar
Assistant Examiner—Anthony Knight
Attorney, Agent, or Firm—Trexler, Bushnell, Giangiorgi & Blackstone

[57] ABSTRACT

A tube joint comprises a tube joint body for interconnecting tubes for passing a fluid, a securement member secured to a panel so as to extend along the panel, a hinge coupling together the tube joint body and the securement member, and locking means provided between the tube joint body and the securement member for locking the tube joint body at a prescribed position at which the tube joint body extends along the panel with the hinge held flexed.

2 Claims, 9 Drawing Figures 4,688,829

TUBE JOINT

FIELD OF THE INVENTION AND RELATED ART STATEMENT

This invention relates to a tube joint for interconnecting tubes for passing a fluid such as a liquid or a gas.

FIG. 1 shows a prior art tube joint with securing means secured to a panel, which has an anchor-like clip 2 integrally projecting from the top of a T-shaped tube joint 1.

This prior art tube joint 1 is secured to a panel P by inserting the clip 2 into a mounting hole H formed in the panel P. When the tube joint 1 is secured by the clip 2 to the panel, however, the individual inlets/outlets 3 of the tube joint 1 are held in the vicinity of the panel surface. Therefore, the open ends of tubes 4 have to be pressure fitted on the inlets/outlets 3 of the tube joint 1 along the panel surface. In this case, the panel surface constitutes an obstacle in the operation of connection or replacement of tubes, thus greatly degrading the efficiency of this operation.

Therefore, with the prior art tube joint 1 it has been necessary to connect the tubes 4 to the individual inlets/outlets 3 of the tube joint 1 before securing the tube joint 1 to the panel P.

OBJECT AND SUMMARY OF THE INVENTION

An object of the invention is to provide a tube joint with which the operation of securing it to a panel surface and the operation of connecting or replacing tubes can be carried out reliably and efficiently.

According to the invention, there is provided a tube joint which comprises a tube joint body for interconnecting tubes for passing a fluid such as a liquid or a gas, a securement member secured to a panel so as to extend along the panel, a hinge coupling together the tube joint body and securement member, and locking means provided between the tube joint body and the securement member for locking the tube joint body at a prescribed position at which the tube joint body extends along the panel with the hinge held flexed.

Thus, with the tube joint according to the invention the tubes can be connected to it with the tube joint body held at a position spaced apart from the panel surface after the securement member has been secured to the panel surface, and the tube joint body with the tubes connected thereto is locked to the securement member by the lock means with the hinge flexed by turning it to the securement member about the hinge. To replace tubes, the lock means is decoupled, and the tube joint body is turned away from the panel surface about the hinge, and at this position of the tube joint body the tubes are replaced with new ones.

According to the invention, the connection and removal of tubes are performed with respect to the tube joint body which is held spaced apart from the panel surface while the securement member is held secured to the panel. Thus, the operation can be carried out readily and reliably.

The above and other objects and features of the invention will become more apparent from the following detailed description with reference to the accompanying drawings.

DETAILED DESCRIPTION OF THE PREFERRED EMBODIMENT

Figure 1:
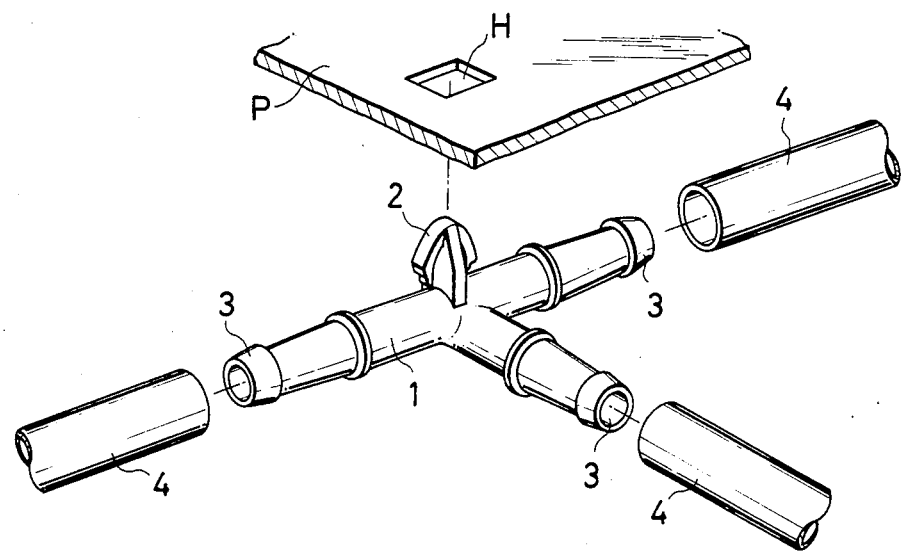
FIG. 1 is a perspective view showing a prior art tube joint.
Figure 3:
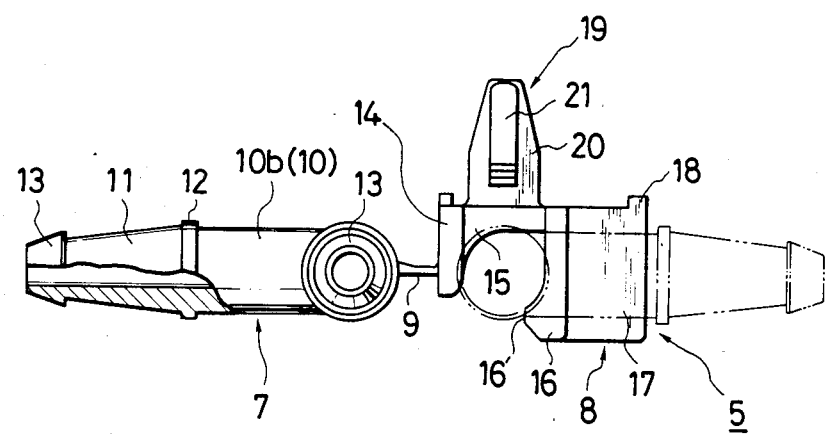
FIG. 3 is a front view showing the tube joint of FIG. 2 in a developed state.
Figure 2:
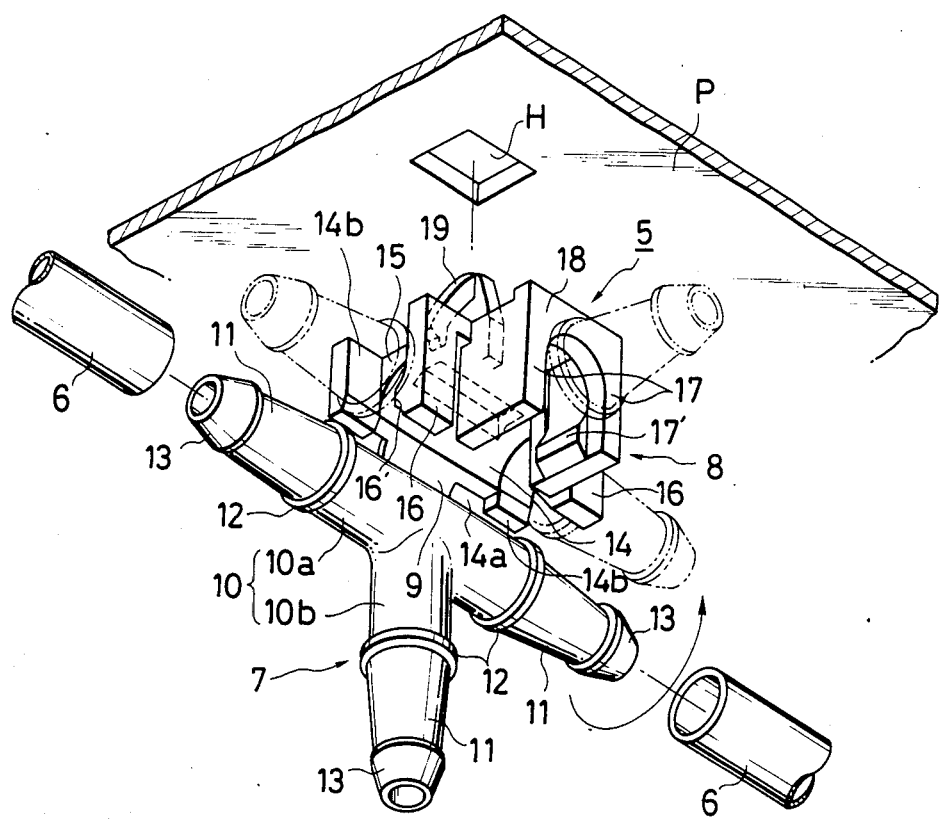
FIG. 2 is a perspective view showing an embodiment of the tube joint according to the invention.
Figure 4:
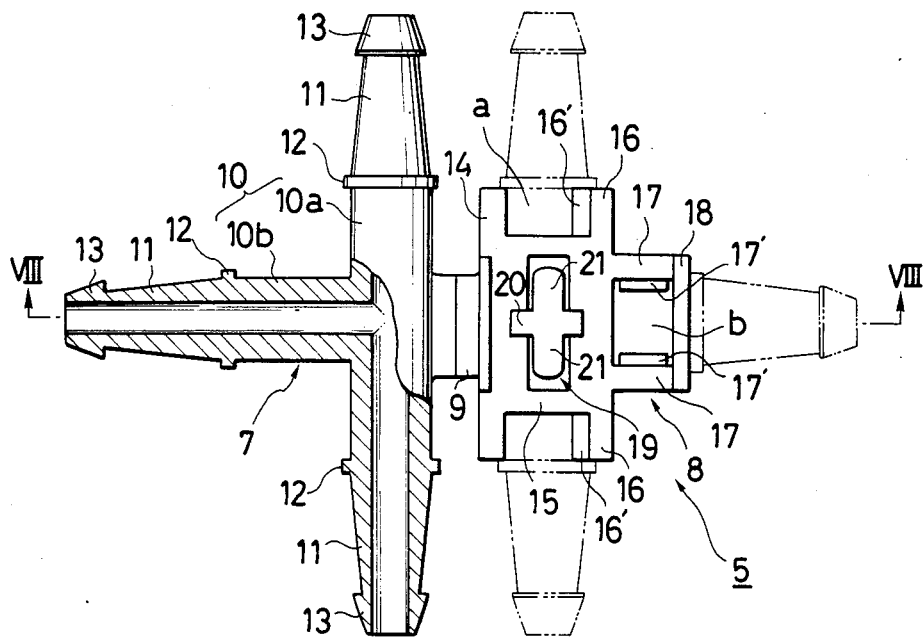
FIG. 4 is a plan view showing the tube joint of FIG. 2 in the developed state.
Figure 5:
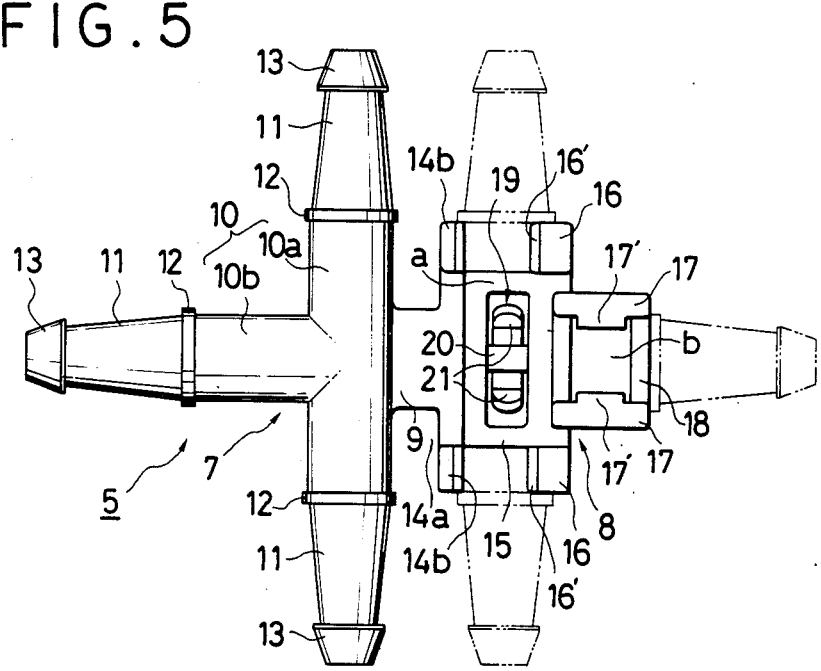
FIG. 5 is a bottom view showing the tube joint of FIG. 2 in the developed state.
Figure 6:
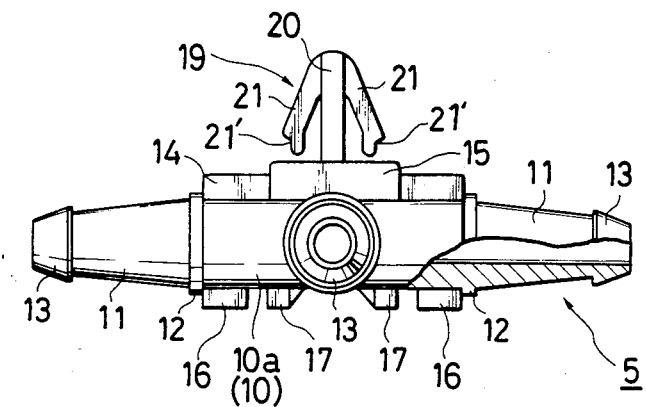
FIG. 6 is a left side view showing the tube joint of FIG. 2.
Figure 7:
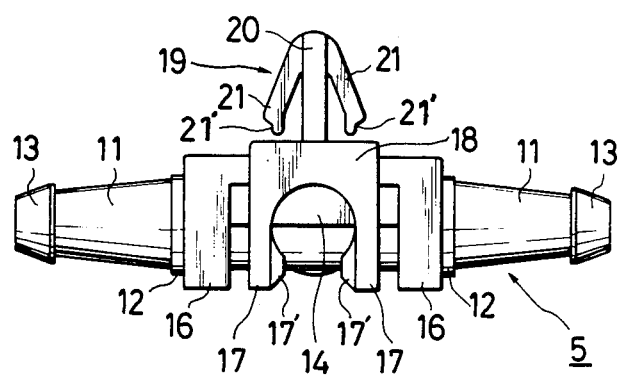
FIG. 7 is a right side view showing the tube joint of FIG. 2.
Figure 8:
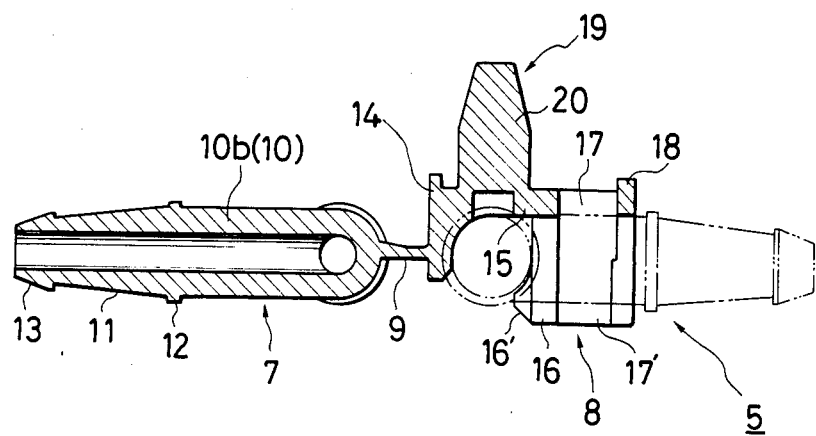
FIG. 8 is a sectional view taken along line VIII—VIII in FIG. 4.
Figure 9:
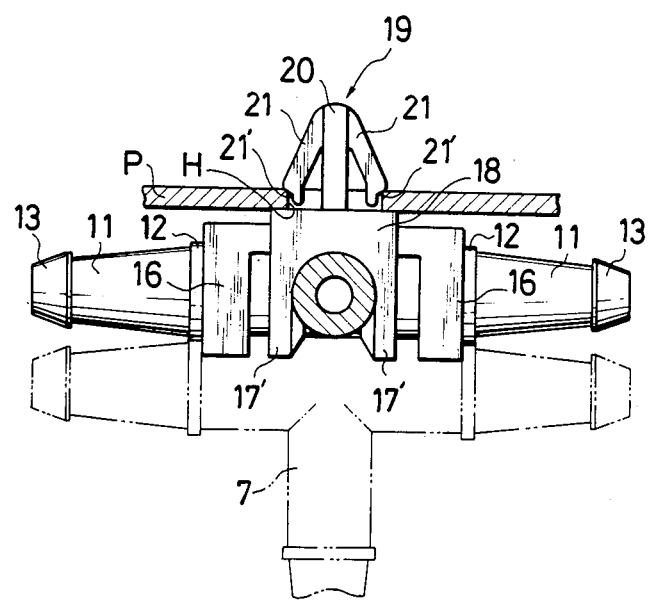
FIG. 9 is a sectional view showing the tube joint secured to a panel.

FIGS. 2 to 9 illustrate an embodiment of the tube joint according to the invention. Reference numeral 5 designates a tube joint which is a one-piece molding of thermoplastic resin. The tube joint 5 comprises a tube joint body 7 for interconnecting tubes 6 for passing a fluid such as a liquid or a gas, a securement member 8 for securement to a panel so as to extend along the panel surface and a hinge 9 coupling together the tube joint body 7 and securement member 8. Between the tube joint body 7 and the securement member 8 there is provided locking means for locking the tube joint body 7 to a position to extend along the panel surface with the hinge 9 flexed.

The tube joint body 7 has a T-shaped joint portion 10 from which three tapered branch tubes 11 extend in three different directions. Each branch tube 11 has a flange 12 provided at its stem. The flange 12 engages the open end of the tube 6 fitted on the branch tube 11. The branch tube 11 has a conical end 13, which is pressure fitted in the tube 6 to retain the tube. The joint portion 10 consists of a first path 10a and a second path 10b extending perpendicularly from a middle position of the first path 10a. The hinge 9 extends from the outer periphery of the first path 10a opposite the second path 10b.

The securement member 8 is provided with the locking means mentioned above, which has one end connected to the other end of the hinge 9 for locking the tube joint body 7, and also securing means for securing itself to a panel surface.

More specifically, the securement member 8 has a plate-like side piece 14 which extends parallel to the first path 10a and has a channel-shaped lower central portion 14a. The other end of the hinge 9 is united to the channel-shaped portion 14a. The side piece 14 has opposite ends 14b. A pair of elastic pieces 16 which are coupled together by a top piece 15 are provided on the side piece 14. The elastic pieces 16, together with the side piece 14, define first space a into which opposite end portions of the first path 10a are fitted from below. The lower end of each elastic piece 16 is provided with an inner lock projection 16' which can engage with a lower portion of the first path 10a.

A pair of clamp pieces 17 which extend horizontally in facing relationship extend from the opposite ends of the top piece 15 such that they are spaced apart from and extend perpendicular to the elastic pieces 16. Between the two clamp pieces 17 there is defined a second space b which communicates at its opposite sides with the first spaces a. The second path 10b is fitted in the second space b from below. The lower end of each clamp piece 17 has an inner lock projection 17' which can engage with a lower portion of the second path 10b. The two clamp pieces 17 are connected by a bridge-like receiving piece 18 to receive the upper portion of the second path 10b.

The securing means consists of an anchor-shaped clip 19 projecting from the center of the top piece 15. The clip 19 has a leg 20 extending upright from the top piece 15 and opposite side arm pieces 21 extending slantedly downwardly from the opposite sides of the free end of the leg 20. Each arm piece 21 has an outer shoulder 21' provided near the free end. The shoulder 21' can engage with the edge of a mounting hole H formed in a panel P.

This tube joint is used as follows. To secure the securement member 8 to the panel surface so as to extend therealong, the clip 19 is inserted through the mounting hole H formed in the panel P from below. As the clip 19 is inserted, the opposite side arm pieces 21 engage and are inwardly flexed by the edge of the hole H. When the arm pieces 21 clear the hole H, they are outwardly click-flexed back so that their shoulders 21' are hooked on the back side of the panel P constituting the edge of the hole H. Thus, the securement member 8 is secured to the panel P so as to extend along the underside of the panel which is clamped between the arm pieces 21 and the top piece 15.

In this state, the tube joint body 7 which is coupled by the hinge 9 to the securement member 8 depends from the securement member under its own weight. In this state, the tubes 6 are fitted on the inlets/outlets 13 of the tube joint body 7 by fitting under pressure the open end of each tube 6 on the associated inlet/outlet 13 until it engages with the flange 12.

With the tubes 6 thus connected to the tube joint body 7, the tube joint body 7 is then turned about the hinge 9 toward the securement member 8 and its joint portion 10 is forcibly fitted in the spaces a and b of the securement member 8 from below.

When each end portion of the first path 10a of the joint portion 10 is forced into the corresponding first space a through the lower open end thereof, its periphery engages with the lock projection 16' of the elastic piece 16 and causes outward flexing of the elastic piece 16. When the outer periphery of the first path 10a clears the lock projection 16', the elastic piece 16 is click-flexed back inwardly by its elastic force, so that the lock projection 16' engages with the lower portion of the first path 10a. Thus, the periphery of the first path 10a is elastically clamped between the lock projection 16' and side piece 14.

Also, when the second path 10b of the joint portion 10 is forced into the second space b through the lower open end, the periphery of the second path 10b engages the lock projections 17' of the opposite side clamp pieces 17 and causes outward flexing thereof. When the periphery of the second path 10b clears the lock projections 17', the clamp pieces 17 are inwardly click-flexed back by elastic force, and the lock projections 17' engage with the lower portion of the second path 10b. Thus, the periphery of the second path 10b is elastically clamped between the two clamp pieces 17.

When the tube joint body 7 with the tubes 6 is thus locked to the securement member 8, the tubes 6 now extend along the lower surface of the panel P.

To replace the tubes 6, the tube joint body 7 with the tubes 6 connected thereto may be downwardly pulled out of the securement member 8. When the tube joint body 7 is pulled, it is detached from the securement member 8 as it is turned about the hinge 9. When the tube joint body 7 is released in this state, the hinge 9 extends straight under the weight of the tubes 6 and tube joint body 7, that is, the tubes 6 and tube joint body 7 are suspended from the securement member 8. In this state, the tubes 6 are sufficiently spaced apart from the lower surface of the panel P. Thus, the tubes 6 can be readily taken out by holding the tube joint body for replacing them with new tubes. When the replacing operation is completed, the tube joint body 7 is again locked to the securement member 8 with the hinge 9 in the flexed state.

As has been described in the foregoing, according to the invention the securement member 8 can be preliminarily secured to the panel surface, so that it is possible to efficiently carry out the operation of securing the securement member 8 and the operation of connecting the tubes. In addition, since the locking means is provided between the tube joint body 7 and securement member 8, the tube joint body 7 and securement member 8 can be locked to each other by the locking means, and the tube joint body 7 will not constitute an obstacle at the time of or after the mounting.

Further, since the tube joint body 7 and securement member 8 are coupled together by the hinge 9, after securing the securement member 8 to the panel surface tubes can be easily and quickly connected or replaced at a position spaced apart from the panel surface. Further, the tube joint body 7 can be locked to the securement member 8 by the locking means with the tubes 6 connected to the tube joint body. Thus the tubes 6 connected to the tube joint body can be readily positioned to extend along the panel surface.

What is claimed is:

1. A tube joint comprising: a tube joint body for interconnecting tubes for passing a fluid; a securement member connectable to a panel so as to extend along said panel; a hinge connecting said tube joint body to said securement member for movement between a first position spaced from said panel, and a second position adjacent the panel when the securement member is secured to the panel; and locking means acting between said tube joint body and said securement member for releasably engaging said tube joint body in said second position.

2. The tube joint of claim 1, wherein said locking means comprises eleastic clamp means for releasably retaining said joint tube body in said second position, said elastic clamp means being shaped for partially underlying said joint tube body when in said second position, thereby preventing movement from said second position until desired.

* * * * *